United States Patent [19]

Bentley

[11] 3,974,853

[45] Aug. 17, 1976

[54] DRIP IRRIGATION VALVE WITH SPRING BIASED PLUNGER

[76] Inventor: Clarence Bentley, 9256 Stamps Ave., Downey, Calif. 90240

[22] Filed: Oct. 17, 1975

[21] Appl. No.: 623,440

[52] U.S. Cl. ............................. 137/503; 137/517; 251/205; 239/109; 239/542
[51] Int. Cl.² ...................................... F16K 31/12
[58] Field of Search .......... 137/497, 498, 500, 503, 137/504, 517, 513.3, 513.5, 513.7, 538, 542; 239/109, 542, 534, 535; 138/43, 46; 251/205, 339

[56] References Cited
UNITED STATES PATENTS

| 371,063 | 10/1887 | Hays | 137/503 |
|---|---|---|---|
| 2,616,445 | 11/1952 | Gaddoni | 137/480 |
| 3,200,839 | 8/1965 | Gallagher | 137/522 X |
| 3,487,435 | 12/1969 | Sheardown | 251/205 X |
| 3,685,735 | 8/1972 | Foster | 239/542 X |
| 3,702,141 | 11/1972 | Wetterhorn | 137/542 X |
| 3,735,777 | 5/1973 | Katzer et al. | 137/517 X |
| 3,908,694 | 9/1975 | Spears | 137/513.3 |

*Primary Examiner*—William R. Cline
*Attorney, Agent, or Firm*—Gordon L. Peterson

[57] ABSTRACT

A drip irrigation valve comprising an outer member having a passage, an inner member receivable in the passage, a groove in one of the members, and a seal carried by the other of the members. Water can be admitted through an inlet to the passage on one side of the seal to provide a fluid force on the inner member. The seal cooperates with the groove to define a restricted flow path. A spring urges the inner member in a direction to oppose the fluid force on the inner member. The groove is tapered or otherwise has regions of different cross sectional areas so that the flow rate through the restricted flow path can be established by the relative axial positions of the inner and outer members.

11 Claims, 6 Drawing Figures

U.S. Patent    Aug. 17, 1976    3,974,853
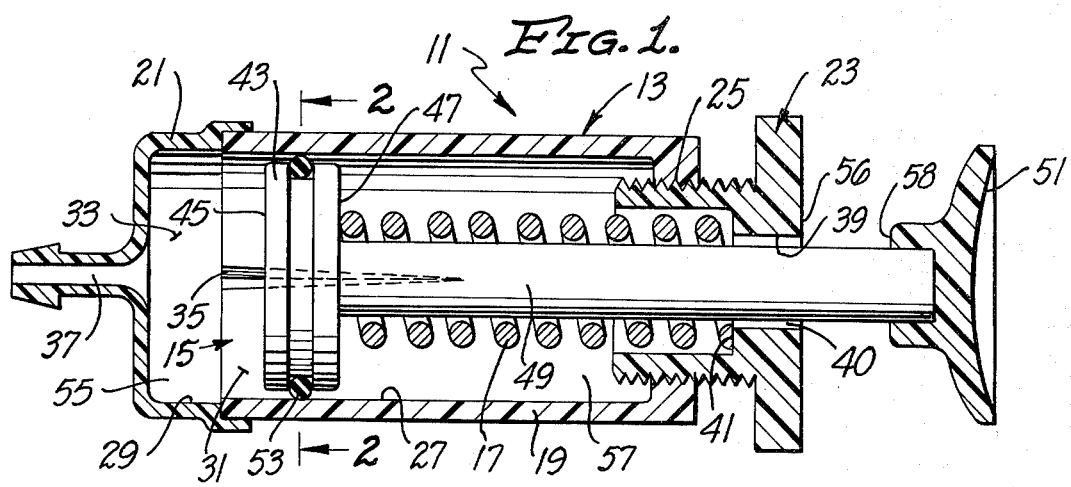
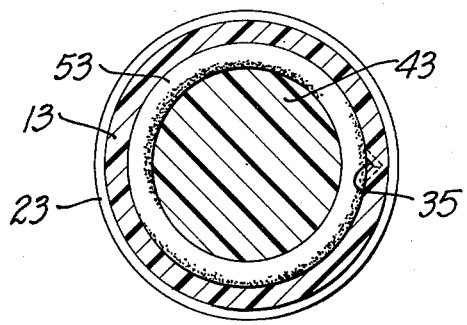
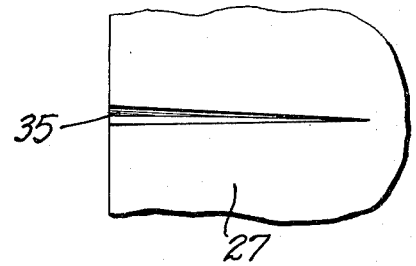
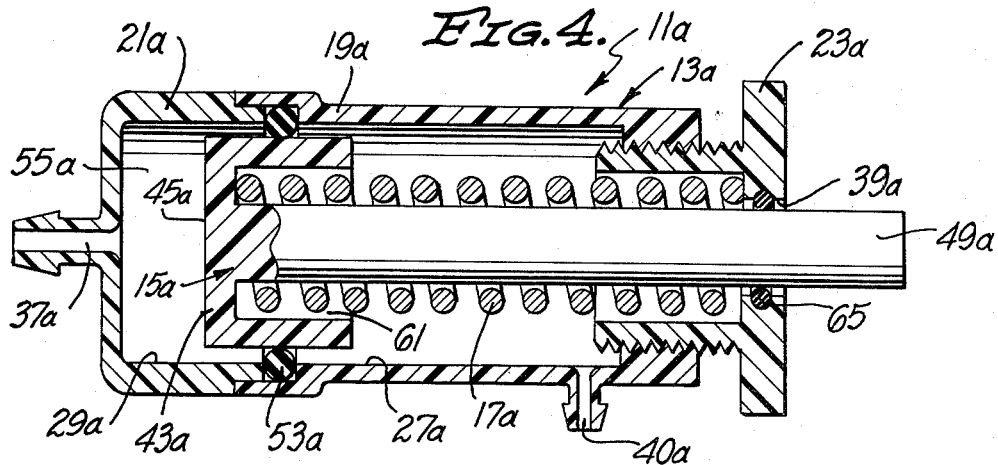
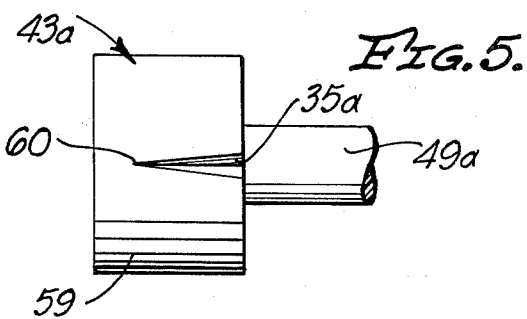
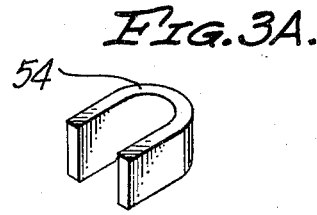

DRIP IRRIGATION VALVE WITH SPRING BIASED PLUNGER

BACKGROUND OF THE INVENTION

In drip irrigation two factors are of utmost importance. First, the flow rate onto the crop must be controlled. A conventional technique for flow rate adjustment is to change the number of emitters as the need for changes in flow rate occurs. For example, in an orchard the number of emitters can be increased as the trees grow in order to provide increased flow rates. This procedure requires an excessive number of emitter valves, increases labor costs to install the additional valves, and provides only stepwise adjustment in flow rate.

A second important factor is compensating for inlet water pressure fluctuations. Such pressure fluctuations may be caused by varying source pressures and/or varying elevations in the field being irrigated.

Copending application Ser. No. 596,222 filed on July 16, 1975 discloses a drip irrigation valve which has both flow control and pressure compensating features. Combining these features in a single drip irrigation valve is most desirable. However, with my prior valve, pressure compensation is achieved by using the inlet pressure to the valve to deform a resilient seal into a groove. Although this is satisfactory, it requires relatively careful control of the hardness of the resilient material of the seal.

SUMMARY OF THE INVENTION

The present invention provides a novel valve in which pressure compensation is provided without having to control the characteristics of a seal or other rubber element. This can be advantageously accomplished by using a variable area orifice and a spring responsive to increases in fluid pressure at the valve inlet to reduce the orifice area. As used herein with reference to drip irrigation valves, the expression "pressure compensating" means an ability to increase the restriction to flow in response to inlet pressure increases. The expression pressure compensating as used herein does not necessarily mean that the flow rate through the valve will be totally immune to inlet pressure fluctuations.

A valve constructed in accordance with the teachings of this invention may include an outer member having an inner surface defining a passage and an inner member having an outer surface, with the inner member being slidably receivable in the passage of the outer member and with the surfaces being generally in confronting relationship.

To provide a flow restriction through the passage, one of the members has a groove in the surface thereof and a seal is carried by the other of the members. For example, the groove may be in the outer member, and the seal may be carried by the inner member. In this event, the seal is engageable with the surface of the passage in sealing relationship to form a fluid barrier. With the members appropriately, relatively axially positioned, the groove extends through the fluid barrier to provide a restricted flow path through the fluid barrier.

With the present invention, pressure compensation is achieved by adjusting the restriction to flow provided by the restricted flow path. This can be advantageously accomplished by providing the groove with a plurality of regions, each of which has a different cross sectional area. For example, the groove may be tapered in width and/or depth, or it may contain dams or orifices along its length. Accordingly, the relative position of the seal and the groove determines which of the regions of the groove will confront the seal and this determines, at least in part, the cross sectional area of the flow path. With this construction, the restricted flow path constitutes a variable area orifice.

The fluid barrier divides the passage into an inlet chamber and an outlet chamber which are interconnected by the flow path. Water is admitted to the inlet chamber and acts on a pressure responsive face of the inner member. To obtain pressure compensation, resilient means resiliently urge the inner member in a direction to oppose the fluid force on the pressure responsive face. This causes the inner member to seek an axial position relative to the outer member which is dependent upon the pressure of the fluid acting on the pressure responsive face. This, in turn, adjusts the relative axial position of the seal and the groove to vary the cross sectional area of the flow path. This enables the cross sectional area of the flow path to be reduced with increasing pressures in the inlet chamber to provide pressure compensation.

In order that the flow rate be adjusted in response to such relative axial movement between the inner and outer members, the groove extends in a first direction and at least one component of the first direction extends axially of the members. Although the groove may extend helically or have a circumferential component, it can, for the sake of simplicity, be an axially extending groove.

The resilient means can advantageously take the form of a coil compression spring acting between the inner member and an end wall of the outer member. To provide for flow rate adjustment, the position of the spring can be adjusted. For example, the outer member may include an adjustable element and the spring may act against the adjustable element and be movable thereby to provide flow rate adjustment.

The valve may also have a shut-off position. This can be accomplished by terminating the groove and making the members relatively axially movable to position the seal along the portion of the surface which is ungrooved.

The members can also be relatively axially moved to a flushing position in which the seal is out of sealing relationship with the surface of the other member. This fully opens the groove and provides for full line pressure in, and massive flow through, the valve to flush out contaminants and particulate matter.

To facilitate relative axial movement of the inner and outer member, the inner member may include a stem which extends through an opening at one end of the valve. The stem can also be used as a spring guide for the spring. If desired, a clearance space can be provided around the stem to define an outlet for the valve. An advantage of this construction is that there are no seals around the stem to frictionally resist axial movement of the inner member.

Another advantage of the spring is that fluctuating inlet pressure will reciprocate the inner member thereby causing foreign matter to be worked through the groove. Inlet pressure could be purposely varied, if desired, to cause this purging action to occur.

The invention can best be understood by reference to the following description taken in connection with the accompanying illustrative drawing.

BRIEF DESCRIPTION OF THE DRAWING

FIG. 1 is an axial sectional view of one form of drip irrigation valve constructed in accordance with the teachings of this invention.

FIG. 2 is a sectional view taken generally along line 2—2 of FIG. 1.

FIG. 3 is a fragmentary view of the inner surface of the outer member illustrating the groove.

FIG. 3A is an isometric view of a clip which is suitable for holding the valve in a shutoff position.

FIG. 4 is an axial sectional view through a second form of drip irrigation valve constructed in accordance with the teachings of this invention.

FIG. 5 is a fragmentary plan view of a portion of the inner member.

DESCRIPTION OF THE PREFERRED EMBODIMENTS

FIG. 1 shows a drip irrigation valve 11 which generally includes an outer member in the form of a valve body or housing 13, an inner member 15, and resilient means in the form of a coil compression spring 17. The valve housing 13 includes tubular sections 19 and 21 suitably interconnected as by an adhesive and an adjustable element 23 attached by screw threads 25 to one end of the tubular section 19. Each of the components of the valve housing 13 may be molded from a suitable plastic material. The tubular sections 19 and 21 have internal or inner surfaces 27 and 29, respectively, which define a passage 31 which, in the embodiment illustrated, is circular in cross section. The surface 29 is of larger diameter than the surface 27, and accordingly the surface 29 defines a passage enlargement 33.

A tapered groove 35 is formed in the inner surface 27. Although the groove 35 could be of various different configurations, in the embodiment illustrated, it extends axially of the valve housing 13. The groove 35 has a plurality of regions therealong with each of the regions having a different cross sectional area. Although the different cross sectional areas of these regions could be provided in different ways, in the embodiment illustrated, the groove 35 progressively widens and deepens as it extends toward the left end of the valve housing 13 as viewed in FIG. 1. The groove 35 terminates at one end at the junction of the inner surfaces 27 and 29. The length of the groove 35 can be selected depending upon how accurately it is desired to pressure compensate.

An inlet 37 is formed at one end of the valve housing 13 and an opening 39 in the adjustable element 23 forms an outlet 40 at the opposite end of the valve housing. The adjustable element 23 can be of various different constructions, but it should provide a shoulder 41 against which the spring 17 can seat. The adjustable element 23 should also be adjustable axially of the valve housing 13 and, in the embodiment illustrated, this is accomplished by the screw threads 25.

The inner member 15 includes a piston 43 having opposed faces 45 and 47 and a stem 49 attached to the piston and extending axially through the opening 39 to the exterior of the valve housing 13. The outer end of the stem 49 is attached to a manually operable member 51 to facilitate relative axial displacement of the valve housing 13 and the inner member 15. As shown in FIG. 1, there is a clearance space around the stem 49 in the opening 39 so that the clearance space can provide the outlet 49 for the valve 11. The stem 49 also serves as a spring guide for the spring 17. To this end, the stem 49 projects axially through the spring 17. The spring 17 bears at its left end on the face 47.

An annular seal 53 is carried by the piston 43. The seal 53 may be considered as dividing the passage 31 into an inlet chamber 55 on the inlet side of the seal, and an outlet chamber 57 on the outlet side of the seal. The seal 53 is sealingly engageable with the inner surface 27 to form a fluid barrier. However, the groove 35 extends through the fluid barrier to provide a flow path through the fluid barrier so that fluid can flow from the inlet 37 through the groove 35 to the outlet 40. The cross sectional area of the flow path through the fluid barrier depends upon the cross sectional area of the groove 35 directly radially outwardly of the seal 53. This, in turn, depends upon the relative axial positions of the valve housing 13 and the inner member 15.

If desired, the seal 53 can be sufficiently soft and deformable so that the differential pressure across the seal tends to expand the seal more than a negligible amount into the groove 35. However, preferably, the seal 53 is sufficiently hard and nondeformable so that at ordinary operating pressures its expansion, if any, into the groove 35, as a result of differential fluid pressures, is negligible.

In operation, the inlet 37 is connected to a source (not shown) of fluid under pressure. The fluid under pressure enters the inlet chamber 55 and acts on the pressure responsive face 45 to force the inner member 15 to the right (as viewed in FIG. 1) against the biasing action of the spring 17. Water flows through the groove 35 radially outwardly of the seal 53 and through the outlet chamber 57 to the outlet 40. The flow rate through the valve 11 is determined by the cross sectional area of the groove 35, and this may be sufficiently small so that drops of water flow out of the outlet 40.

If the pressure in the inlet chamber 55 should increase, the differential pressure across the piston 43 correspondingly increases to move the piston and the seal 53 further to the right. This exposes a region of the groove 35 of a smaller cross sectional area to the seal 53. In other words, the cross sectional area of the flow path around the seal 53 reduces to compensate for an increase in inlet pressure. Conversely, a decrease in inlet fluid pressure allows the spring 17 to urge the piston 43 to the left to bring a region of the groove 35 of a larger cross sectional area immediately radially outwardly of the seal 53.

The spring rate of the spring 17 is preferably linear. However, the spring rate of the spring 17, the area of the face 45, and the cross sectional area of the groove 35 can be selected to provide the results desired.

The valve 11 can be adjusted so that for a given inlet pressure it will provide a selected flow rate. This can be accomplished by turning of the adjustable element 23. To obtain larger flow rates for a given inlet pressure, the adjustable element 23 is turned to axially advance the adjustable element further to the passage 31. Conversely, to reduce the flow rate, the adjustable element 23 is turned to move the latter axially outwardly. Thus, the adjustable element 23 can be turned to change the location of the piston 43 for a given pressure in the inlet chamber 55.

To flush the valve 11, the stem 49 is pushed inwardly to move the inner member 15 to the left until the seal 53 confronts the inner surface 29. This constitutes a flushing position in that the diameter of the inner surface 29 is oversized relative to the seal 53 so that the seal is out of sealing relationship with the surface 29. This permits massive, relatively high pressure flow through the valve housing 13 to flush contaminants and particulate matter from the groove 35 and from other portions of the interior of the valve.

By moving the inner member 15 to the right until the seal 53 is out of contact with the groove 35, a shut-off position is reached. In the shut-off position, the seal 53 sealingly engages the surface 27 for a full 360°, and there is no flow path through the fluid barrier. The shut-off position can be obtained manually or in response to very high pressures in the inlet chamber 55. If desired the inner member 15 can be held in the shut-off position by placing a member, such as a horseshoe shaped clip 54 (FIG. 3A), between an outer end surface 56 of the adjustable element 23 and an annular shoulder 58 on the member 51.

FIGS. 4 and 5 show a drip irrigation valve 11a which is identical to the valve 11 in all respects not shown or described herein. Portions of the valve 11a corresponding to portions of the valve 11 are designated by corresponding reference numerals followed by the letter a.

The primary difference between the valves 11 and 11a is that in the latter, the groove 35a is formed in the piston 43a and the seal 53a is carried by the housing 13a. Specifically, the tubular sections 19a and 21a define a groove for retaining the seal 53a. The piston 43a has an outer surface 59 which confronts the inner surfaces 27a and 29a and which has the axial groove 35a formed therein. The groove 35a opens radially outwardly and may be identical to the groove 35 except that the former is of progressively increasing cross sectional area as it extends toward the outlet 40a. The groove 35a begins at the right end of the piston 43a and extends axially to a termination point 60 which is spaced inwardly from the left end of the piston. The axial dimension of the piston 43a is greater than the axial dimension of the piston 43 (FIGS. 1–3) in order to provide adequate length for the groove 35a.

The valve 11a also differs from the valve 11 with respect to certain structural details. Thus, the piston 43a is integral with the stem 49a and defines an annular pocket 61 for receiving one end of the spring 17a. The embodiment of FIG. 4 eliminates the manually operable member 51 and the inner surfaces 27a and 29a may be of equal diameter. The valve 11a has an outlet 40a extending radially from the peripheral wall of the valve housing 13 and the opening 39a is closed in any suitable manner such as by a seal 65. In addition, the tubular section 21a is axially elongated relative to the tubular section 21.

The operation of the valve 11a is identical to the operation of the valve 11. The only differences are that the flow path around the seal 53a is through the groove 35a in the piston 43a and the location of the valve outlet has been moved. The flow rate through the valve 11a for a given pressure in the inlet chamber 55a can be adjusted using the adjusting element 23a, as described above. By forcing the inner member 15a to the left until the surface 59 is separated from the seal 53a, the flushing position is obtained. Conversely, a shut-off position is provided by moving the inner member 15a to the right until the termination point 60 is moved to the right of the seal 53a.

Another feature which is applicable to both the valves 11 and 11a is that foreign material such as particulate matter can be worked through the groove. For example, with the valve 11a, naturally occurring pressure fluctuations in the fluid in the inlet chamber 55a will impart axial movement to the inner member 15a as described above. This axial movement of the inner member 15a relative to the outer member 13a tends to roll particulate material through the groove 35a to prevent clogging of the groove.

If desired, the pressure in the inlet chamber 55a can be intentionally varied to cause this purging action to occur. Specifically, the pressure of the liquid in the inlet chamber 55a could be varied to first move the inner member in one axial direction and then in the other axial direction. The length of the stroke of the inner member 15a will depend on the spring rate of the spring 17a and the magnitude of the pressure variation. The rate of reciprocation of the inner member 15a will depend on the frequency with which the pressure is varied.

Although exemplary embodiments of this invention have been shown and described, many changes, modifications and substitutions may be made by those having ordinary skill in the art without necessarily departing from the spirit and scope of this invention.

I claim:
1. A drip irrigation valve comprising:
an outer member having an inner surface defining a passage;
an inner member having an outer surface, said inner member being receivable in said passage of the outer member with said surfaces being generally in confronting relationship, said members being relatively axially movable, said inner member having a pressure responsive face in said passage;
one of said members having a groove in said surface thereof, said groove having a plurality of regions with each of said regions having a different cross sectional area, said groove extending in a first direction, at least one component of said first direction extending axially of said one member;
a seal carried by the other of said members and engageable with at least a first region of the surface of said one member in sealing relationship to form a fluid barrier;
means for admitting fluid to said passage on one side of the fluid barrier so that the fluid can act on the pressure responsive face of the inner member and urge the inner member in one axial direction relative to the outer member;
means for discharging fluid from said passage on the other side of said fluid barrier;
said groove being extendible through the fluid barrier to provide a flow path through the fluid barrier whereby fluid can flow from the admitting means to the discharging means;
resilient means for resiliently urging the inner member in a direction to oppose the fluid force on the pressure responsive face whereby the region of the groove which extends through the fluid barrier and the flow through the fluid barrier are dependent upon the pressure of the fluid acting on the pressure responsive face; and
said members being relatively axially movable to a flushing position in which the seal is out of engagement and sealing relationship with at least said first region of said surface of said one member to allow flow past the seal, said inner member including a stem extending through one end of the outer mem- ber to facilitate relative axial movement of said members.

2. A valve as defined in claim 1 wherein said groove terminates so that a portion of said surface of said one member is ungrooved and said members are relatively axially movable to position said seal at said portion of said surface of said one member to provide a shut-off position in which there is substantially no flow from the admitting means to the discharging means.

3. A valve as defined in claim 1 including adjustable means for adjusting the position of the resilient means to vary the flow rate through the flow path for a given differential pressure across the flow path.

4. A valve as defined in claim 3 wherein said groove terminates so that a portion of said surface of said one member is ungrooved and said members are relatively axially movable to position said seal at said portion of said surface of said one member to provide a shut-off position in which there is substantially no flow from the admitting means to the discharging means.

5. A valve as defined in claim 1 wherein said outer member has an opening at one end thereof, said stem projects through said opening, said opening relatively loosely receiving said stem to define a clearance space, said discharging means including said clearance space.

6. A valve as defined in claim 1 wherein said fluid barrier divides said passage into an inlet chamber and a discharge chamber with the pressure responsive face being in the inlet chamber, said outer member includes a body member and an adjustable member having an opening therein and threadedly attached to the body member, and said resilient means includes a coil compression spring in the discharge chamber surrounding said stem and acting between the adjustable member and the inner member.

7. A valve as defined in claim 1 wherein said outer member is said one member and one end of said passage is radially enlarged to permit the members to be relatively axially moved to said flushing position.

8. A valve as defined in claim 1 wherein said inner member is said one member.

9. A valve as defined in claim 1 wherein said outer member is said one member.

10. A valve as defined in claim 9 wherein said outer member includes an adjustable element mounted for movement along a path having an axial component, said resilient means including a spring acting between said inner member and said adjustable element.

11. A valve as defined in claim 10 wherein said adjustable element has an opening therein and said inner member includes a stem extending through said opening to facilitate relative axial movement between said members.

* * * * *